US005550738A

United States Patent [19]

Bailey et al.

[11] Patent Number: 5,550,738

[45] Date of Patent: Aug. 27, 1996

[54] SYSTEM FOR RECORDING AND ANALYZING VEHICLE TRIP DATA

[75] Inventors: Brian L. Bailey; Harvey L. Clayman, both of Dayton, Ohio

[73] Assignee: TeamNet, Inc., Dayton, Ohio

[21] Appl. No.: 292,874

[22] Filed: Aug. 19, 1994

[51] Int. Cl.[6] .................................................. G06F 17/40

[52] U.S. Cl. ...................................... 364/424.04; 340/459

[58] Field of Search ........................ 364/424.01, 424.03, 364/424.04, 550, 551.01; 340/425.5, 438, 459

[56] References Cited

U.S. PATENT DOCUMENTS

| | | | |
|---|---|---|---|
| 4,067,061 | 1/1978 | Juhasz | 364/900 |
| 4,344,136 | 8/1982 | Panik | 364/424 |
| 4,395,624 | 7/1983 | Wartski | 377/15 |
| 4,644,368 | 2/1987 | Mutz | 346/33 D |
| 4,685,061 | 8/1987 | Whitaker | 364/424 |
| 4,804,937 | 2/1989 | Barbiaux et al. | 340/52 F |
| 4,853,856 | 8/1989 | Hanway | 364/424.01 |
| 4,853,859 | 8/1989 | Morita et al. | 364/424.04 |
| 4,856,072 | 8/1989 | Schneider et al. | 381/86 |
| 4,858,133 | 8/1989 | Takeuchi et al. | 364/424.04 |
| 4,866,616 | 9/1989 | Takeuchi et al. | 364/424.04 |
| 4,875,167 | 10/1989 | Price et al. | 364/424.04 |
| 4,939,652 | 7/1990 | Steiner | 364/424.04 |
| 5,046,007 | 9/1991 | McCrery et al. | 364/424.04 |
| 5,065,321 | 11/1991 | Bezos et al. | 364/424.04 |
| 5,072,701 | 12/1991 | Khan et al. | 123/142.5 E |
| 5,239,470 | 8/1993 | Komatsu | 364/424.04 |
| 5,305,214 | 4/1994 | Komatsu | 364/424.04 |
| 5,325,082 | 6/1994 | Rodriguez | 340/438 |
| 5,337,236 | 8/1994 | Fogg et al. | 364/424.04 |
| 5,379,219 | 1/1995 | Ishibashi | 364/424.04 |

*Primary Examiner*—Collin W. Park
*Attorney, Agent, or Firm*—Thompson Hine & Flory P.L.L.

[57] ABSTRACT

A vehicle monitoring system having a microprocessor-based vehicle recording unit, a remote computerized data reporting unit and a data transfer interface. The vehicle recording unit is mounted on the vehicle and is automatically activated by a vibration sensor signal each time the vehicle is used, to time-stamp each trip and record the distance travelled. The vehicle unit updates and records the distance traveled based upon the number of pulses received from a magnetic sensor mounted on the vehicle. After data from a trip has been recorded in the vehicle unit, a data interface such as an electronic memory card is used to download the data to the remote reporting unit for analysis and generation of reports on trip activity.

24 Claims, 5 Drawing Sheets

SYSTEM FOR RECORDING AND ANALYZING VEHICLE TRIP DATA

BACKGROUND OF THE INVENTION

The present invention relates to a vehicle monitoring system, and more particularly, to a vehicle system which automatically records data regarding vehicle travel and which interfaces with a remote data processing system for analysis and storage of the data.

It is often desirable to monitor and record information regarding the time and distances traveled by a motor vehicle. This information can be useful for tracking vehicle maintenance or fuel requirements. Further, if the vehicle is used for both personal and business travel, it is desirable to monitor and record the business mileage for tax purposes.

It can be tedious and time-consuming to log vehicle travel data manually, since the operator must write down the vehicle mileage and travel time each time a trip is taken in the vehicle. In addition, since manual logs require operator initiative in recording information, it is easy for the operator to forget to record an item of data when preoccupied with driving or with other distractions on the road or in the vehicle, thereby leading to inaccurate recordkeeping.

Vehicle data collection systems have been developed which record and store travel information as the vehicle is operated. However, these systems have traditionally displayed or printed travel data from the vehicle unit. The printing or displaying of data from the vehicle unit adds to the size and complexity of the unit, thereby increasing the amount of space occupied by the unit in the vehicle. Further, these systems have traditionally not included any means for analyzing or generating reports based upon the travel data.

Therefore, it is desirable to have a vehicle monitoring system which will automatically record and store travel data for each vehicle trip without the need for operator input. Further, it is desirable to have a computerized reporting system as part of the vehicle system for analyzing, storing and generating reports on travel data. Further, it is desirable to have a computerized reporting system that is remote from the vehicle unit, so that the space occupied by the vehicle unit is minimized. Further, it is desirable to have a convenient method for transferring travel data from the vehicle unit to the remote reporting system.

SUMMARY OF THE INVENTION

The present invention is a vehicle monitoring system which consists of a vehicle recording system, a data reporting system and a data transfer interface. The vehicle recording system is mounted in the vehicle and is automatically activated each time the vehicle is used to time-stamp each trip and record the distance travelled. After data from a trip has been recorded in the vehicle unit, it is downloaded to the data reporting unit for analysis or use in generating reports on trip activity. By transferring data from the vehicle unit to the data reporting system for storage and reporting, the present invention reduces the amount of space occupied in the vehicle, eliminates much of the time spent preparing vehicle usage logs, and allows for a variety of computer-generated reports on vehicle information.

The vehicle recording system includes a magnetic sensor which is mounted on the vehicle so as to lie adjacent to a vehicle component, such as the drive shaft, which rotates in proportion to vehicle speed. The magnetic sensor detects rotation of the component, and generates pulses in response thereto. The pulses are transmitted from the magnetic sensor to a vehicle data unit, which is mounted in the vehicle interior for receiving and recording the pulses.

The vehicle unit includes an electronic clock which generates a date and time signal; a microprocessor which records a start time and date from the clock at the initiation of a trip and an end time and date from the clock at the conclusion of the trip, and which receives the pulses from the magnetic sensor and continuously updates the travel distance based upon the number of pulses received. A vibration sensor is mounted in the unit for detecting vehicle motion. The microprocessor records a start time and date and begins updating the travel distance upon detecting a change of state in the vibration sensor. The microprocessor stops updating the travel distance and stores the distance traveled and the ending time and date when the vibration sensor has failed to change state for a predetermined time period. The vehicle unit also includes a data storage memory for receiving and storing trip starting times, ending times and travel distances, and a program storage memory for storing instructions for the microprocessor. A power supply is included in the vehicle unit for operating the microprocessor, the data storage memory, and the clock from vehicle power while the vehicle is running, and a battery is included for operating the data storage memory and clock when the vehicle power is discontinued. A control panel with status lights and input keys is located on the front of the vehicle unit.

The system also includes a computer remote from the vehicle unit, for analyzing the travel data and generating trip reports. The remote computer includes software for generating the trip reports in an operator designed format. An electronic memory card is used for transferring travel data from the vehicle unit to the remote data reporting unit. In an alternate embodiment, travel data is transmitted by a cellular modem to the local cellular network, and is then transmitted from the network to the remote computer. Preferably, the modem utilizes cellular digital packet data network technology.

Accordingly, it is an object of the present invention to provide a vehicle monitoring system which automatically monitors vehicle operation and stores travel data each time the vehicle is used; a system which begins recording trip information immediately upon detecting a change of state in a vibration sensor indicating vehicle motion; a system in which the recording unit and the reporting unit are physically separate, so that the recording unit can be mounted unobtrusively in the vehicle and the reporting system can perform high-level computer analysis of the vehicle information; and a system wherein various communication methods, including cellular modem technology, can be used to transmit data between the vehicle recording and reporting units.

Other objects and advantages of the present invention will be apparent from the following description, the accompanying drawings and the appended claims.

DETAILED DESCRIPTION

Figure 1:
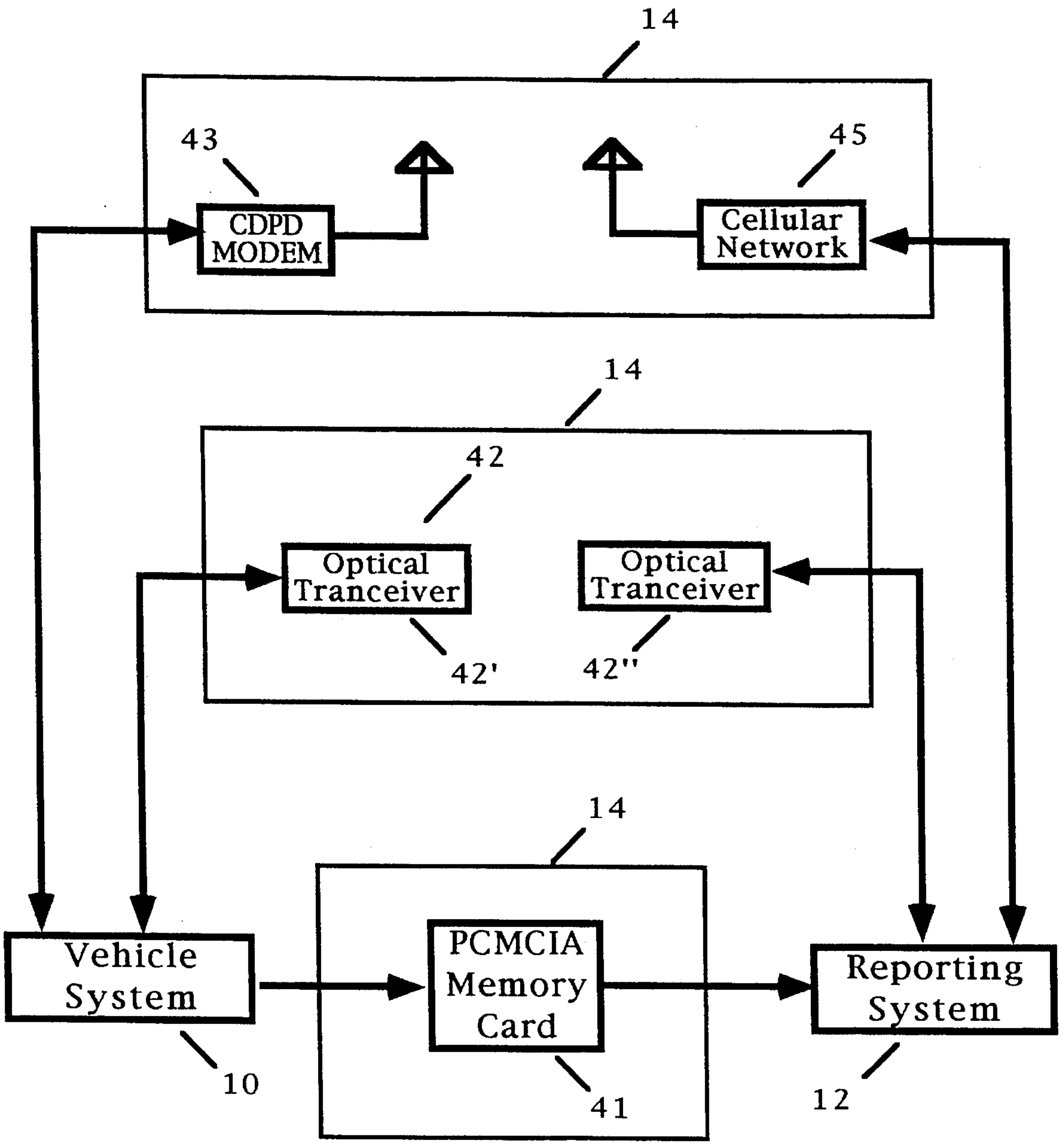
FIG. 1 is a block diagram of a vehicle monitoring system according to the present invention.

As shown in FIG. 1, the vehicle monitoring system of the present invention consists of three basic elements. The first element is a vehicle recording system 10, which is mounted inside a motor vehicle to record travel data from the vehicle. The second element is a data reporting system 12, which is comprised of a microcomputer and software for archiving and analyzing travel data recorded by one or more vehicle systems. The third element is a data interface 14, which can be any one of several methods, which will be described in more detail below, for transferring data between the vehicle recording system 10 and the data reporting system 12.

Figure 2:
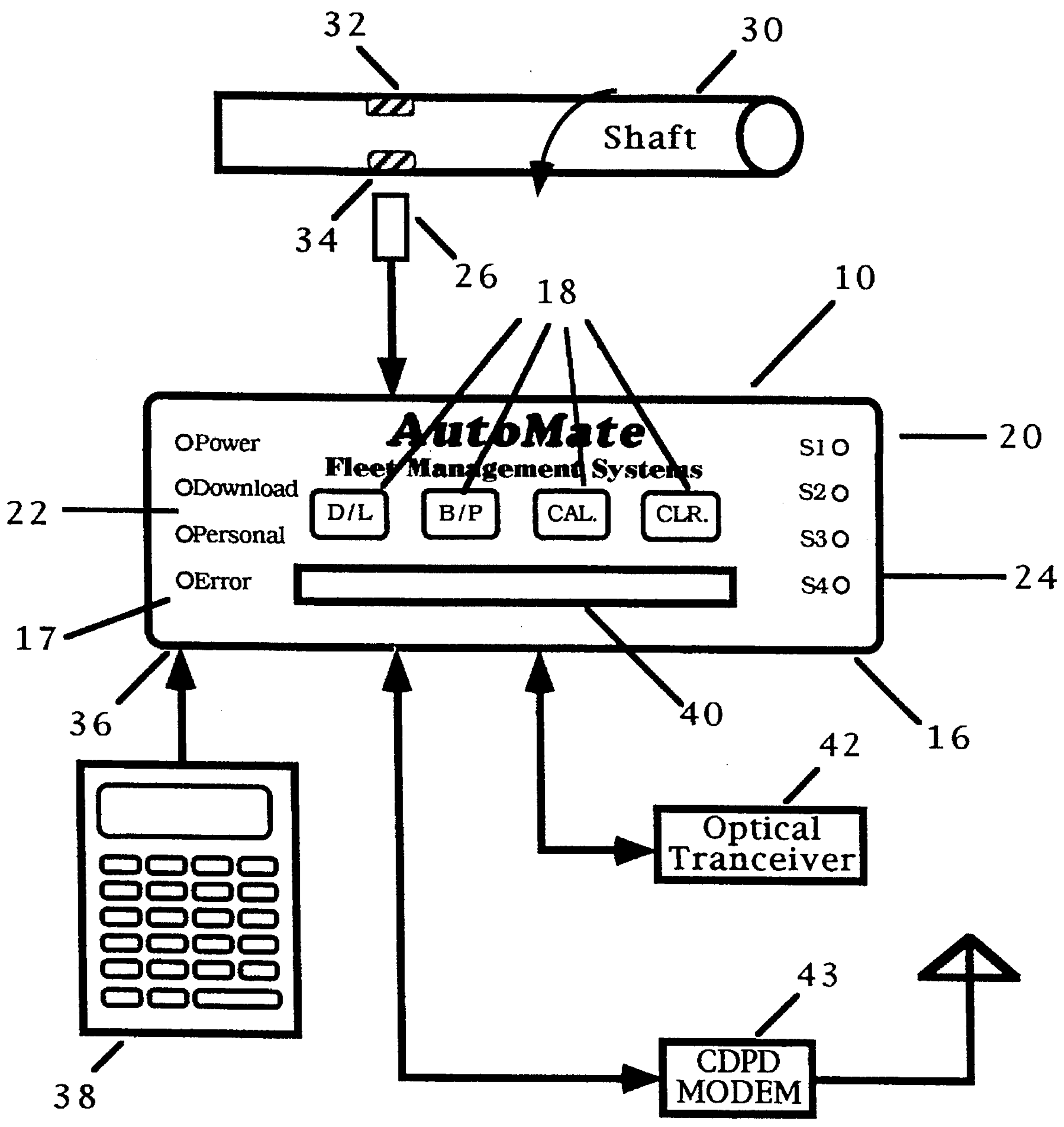
FIG. 2 is a front view of the vehicle recording unit and the magnetic sensor.

FIG. 2 shows the vehicle reporting system 10 of the preferred embodiment of the invention in more detail. As shown in FIG. 2, the vehicle system includes a microprocessor-based vehicle data unit 16. The unit 16 includes a control panel 17 containing a plurality of control buttons 18, labeled "download," "personal," "calibration" and "clear" as shown. The control button 18 marked "personal" enables the operator to distinguish between business and personal trips in the trip record, and eventually in the trip reports, by pushing the "personal" control button at the beginning of any trip that does not qualify as business. If the "personal" button is not pushed, the unit defaults to business.

The control panel 17 also includes a plurality of status lights 20 which are selectively lit to indicate error conditions in the system. For example, a status light goes on if the unit memory is full and needs to be downloaded, or if the unit sensors are not functioning properly. In addition to the status lights 20, the control panel 17 includes a plurality of function lights 22, which are selectively lit when the corresponding control button 18 has been depressed by the operator, or to indicate that the unit 16 is powered on or in an error state. A power inlet 24 is located at the side of the unit 16. The power inlet 24 is electrically connected to the vehicle power supply (not shown) for supplying vehicle power to the unit 16. In the preferred embodiment, the unit 16 is powered with 12 volts from the vehicle.

A magnetic sensor 26 is mounted on the vehicle (not shown), remote from the vehicle unit 16. In the preferred embodiment, the sensor 26 is a Hall-Effect sensor. The sensor 26 is mounted so that it lies adjacent to a vehicle component whose speed of rotation is proportional to vehicle speed. In the preferred embodiment, the sensor 26 is mounted so that it lies adjacent to either the drive shaft or an axle 30; however, the sensor could also be placed adjacent to the vehicle speedometer, odometer or wheel wells without departing from the scope of the invention. A pair of magnets 32, 34 are attached to the drive shaft 30 by conventional means, such as gluing. The magnets are attached so that they aline with the sensor 26 as the shaft 30 is rotated, as shown in FIG. 2. The sensor 26 is mounted on the vehicle so that a gap of approximately ¼" exists between the magnets 32, 34 and the sensor.

The unit 16 also includes a connection 36 to accommodate the attachment of a remote keyboard 38 as shown in FIG. 2. A remote keyboard can be connected to the unit 16 for inputting trip identification information, such as an operator or vehicle number.

In the preferred embodiment, the unit 16 includes a memory card slot 40 which is adapted to receive a memory card such as a PCMCIA ("Personal Computer Memory C and International Association") static RAM memory card 41 FIG. 1. An electronic memory card is one of the interface methods which can be used in accordance with the present invention for transferring data between the vehicle unit 16 and the reporting system 12.

In a first alternate embodiment, the unit 16 includes an infrared transceiver interface 42 for transmitting travel data by infrared light beam between the vehicle unit 16 and the data reporting system 12. In this alternate embodiment, the vehicle transceiver 42' would be located on the dashboard of a vehicle (not shown), and would transmit information to a receiving or reporting device 42" as the vehicle is driven past the receiving device (see also FIG. 1).

In a second alternate embodiment, the unit 16 includes a cellular modem 43 for transmitting travel data between the unit 16 and the reporting system 12, using a cellular digital packet data network. The cellular modem 43 breaks the travel data into individual, self-contained packets and transfers the data packets over preexisting cellular channels to a router 45 in the reporting system 12 (see FIG. 1). The cellular network utilizes channel-hopping to transmit the data packets during idle time between cellular voice calls, in order to avoid data collisions between data and voice transmissions. The cellular modems utilize communications software based upon the internet protocol to wirelessly transfer the travel data from the vehicle to the reporting system.

Figure 3:
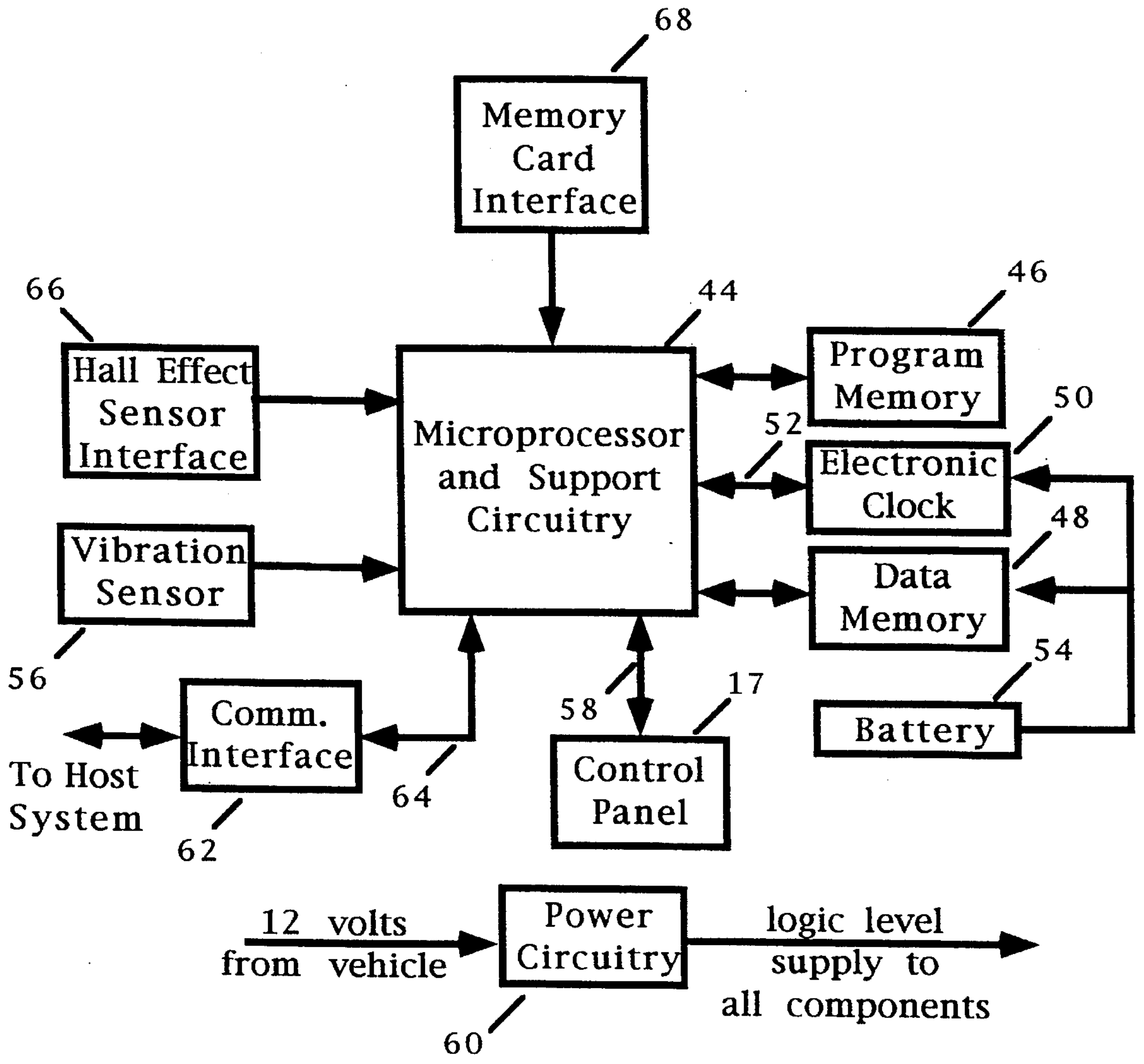
FIG. 3 is a block diagram of the vehicle recording unit.

As shown in FIG. 3, the internal structure of the vehicle unit 16 includes a microprocessor 44 and its support circuitry. In the preferred embodiment, the microprocessor 44 is a 8031 8-bit microprocessor. The microprocessor 44 is coupled to a program storage memory 46 which stores instructions for the microprocessor. In the preferred embodiment, the program memory is a 27C256 EPROM integrated circuit chip.

The microprocessor 44 is also coupled to a data storage memory 48. In the preferred embodiment, the data memory 48 is a 32K×8 bit static RAM. The data memory is used for storing trip start and end times, the number of pulses from the sensor 26, a vehicle identification number and a vehicle calibration factor. An electronic clock 50 is contained within the vehicle unit 16 and is coupled to the microprocessor 44 at line 52. In the preferred embodiment, the clock 50 is a real-time clock integrated circuit which includes both a clock and a calendar. However, other similar clocks may be used without departing from the scope of the invention. The clock 50 is accessed by the microprocessor 44 at the start and end of each trip to record the times and dates for the trip. In addition, the clock 50 periodically sends a pulse to the microprocessor 44 to trigger the microprocessor to go into a motion checking state during which it determines whether the vehicle is still in motion. The motion checking state will be described in more detail below.

A battery 54 is included in the unit 16. In the preferred embodiment, the battery is a lithium battery. Although the unit 16 is primarily powered from the vehicle during vehicle operation, the battery 54 provides an auxiliary source of power for operating the clock 50 and data memory 48 when the vehicle is turned-off. Battery 54 enables the unit 16 to accurately maintain the time and date, as well as retain trip data, even when the vehicle is not in use.

A vibration sensor 56 is also located in the unit 16 and coupled to the microprocessor 44. In the preferred embodiment, the vibration sensor 56 is a mercury-switch containing two lead connections. As the vehicle moves, the mercury inside the sensor 56 moves, thereby opening and closing the lead connections. This changing of state between an open and a closed position provides an indication to the microprocessor 44 that the vehicle is in motion.

The control buttons 18, status lights 20 and function lights 22 on the control panel 17 are connected to the microprocessor 44 by line 58, in order to transmit an operator request from a depressed button to the microprocessor, and to control the lights in accordance with operator-inputted commands or operating conditions in the unit. Power circuitry 60 is included within the unit 16 as an interface between the vehicle power supply and the unit components, in order to provide the proper operating voltages to each of the components. A communications interface 62 is connected to the microprocessor 44 over line 64 to enable a remote device such as the keyboard 38 or a computer to be connected to the microprocessor.

The magnetic sensor 26 is coupled to the microprocessor 44 at interface 66. This interface 66 enables power to be supplied to the sensor 26 from the microprocessor 44, and enables pulses to be sent from the sensor to the microprocessor. A memory card interface 68 extends between the card slot 40 and the microprocessor 44 for transferring data from the data memory 48 to a card (not shown) under the control of the microprocessor.

Figure 4:
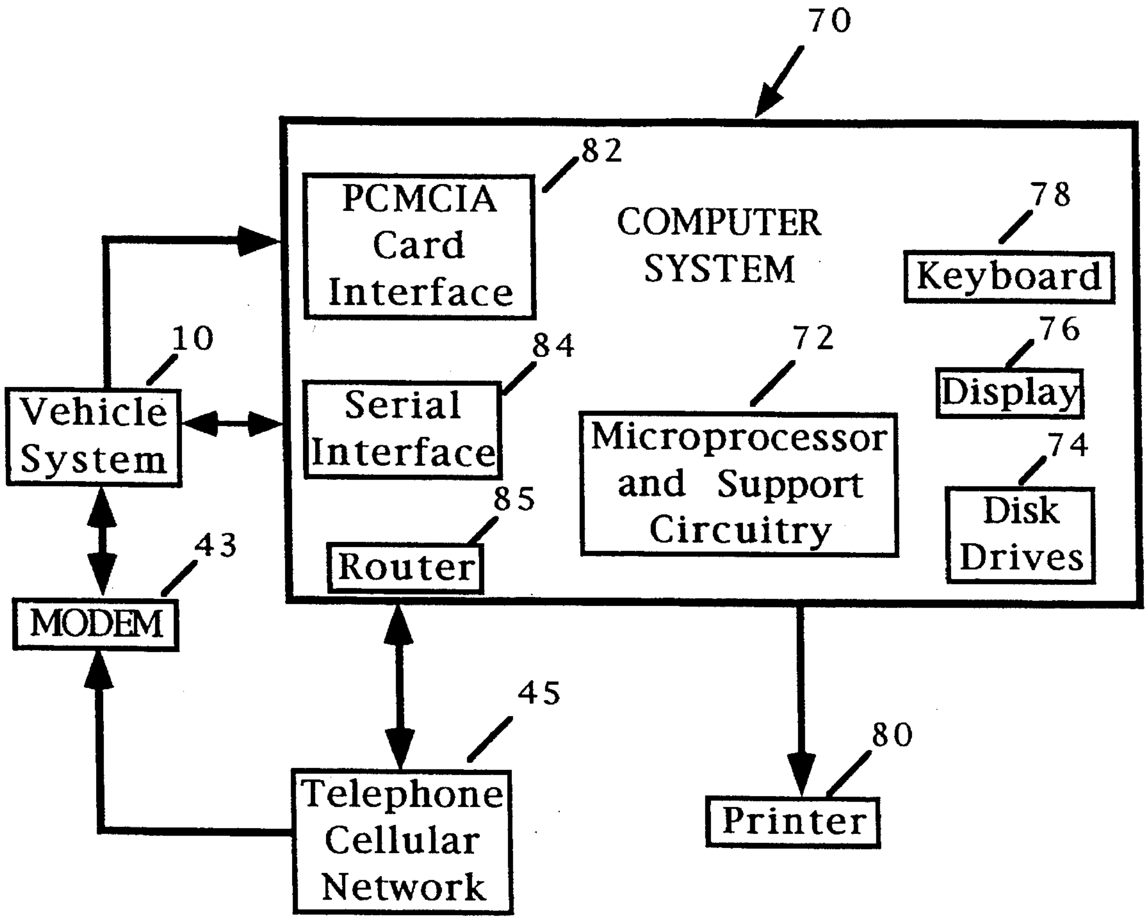
FIG. 4 is a block diagram of the data reporting unit.

FIG. 4 depicts the data reporting system 12 portion of the invention in more detail. As shown in FIG. 4, the reporting system consists of a computer, such as a personal computer, generally designated as 70, having a microprocessor and support circuitry 72, a disk drive 74, a display screen 76, a keyboard 78 and a printer 80. The computer 70 also includes a PCMCIA card interface 82. Through the interface 82, the reporting system 12 reads vehicle data which was downloaded to the PCMCIA card by one or more vehicle units, in order to archive and analyze the data. In addition, the computer 70 can optionally include a serial interface 84 for transferring data and commands between the microprocessor 72 and the vehicle unit 16. Computer 70 also preferably includes the router 45, which receives signals that have been transmitted from a telephone cellular network 85 to the network by cellular modem 43.

Figure 5:
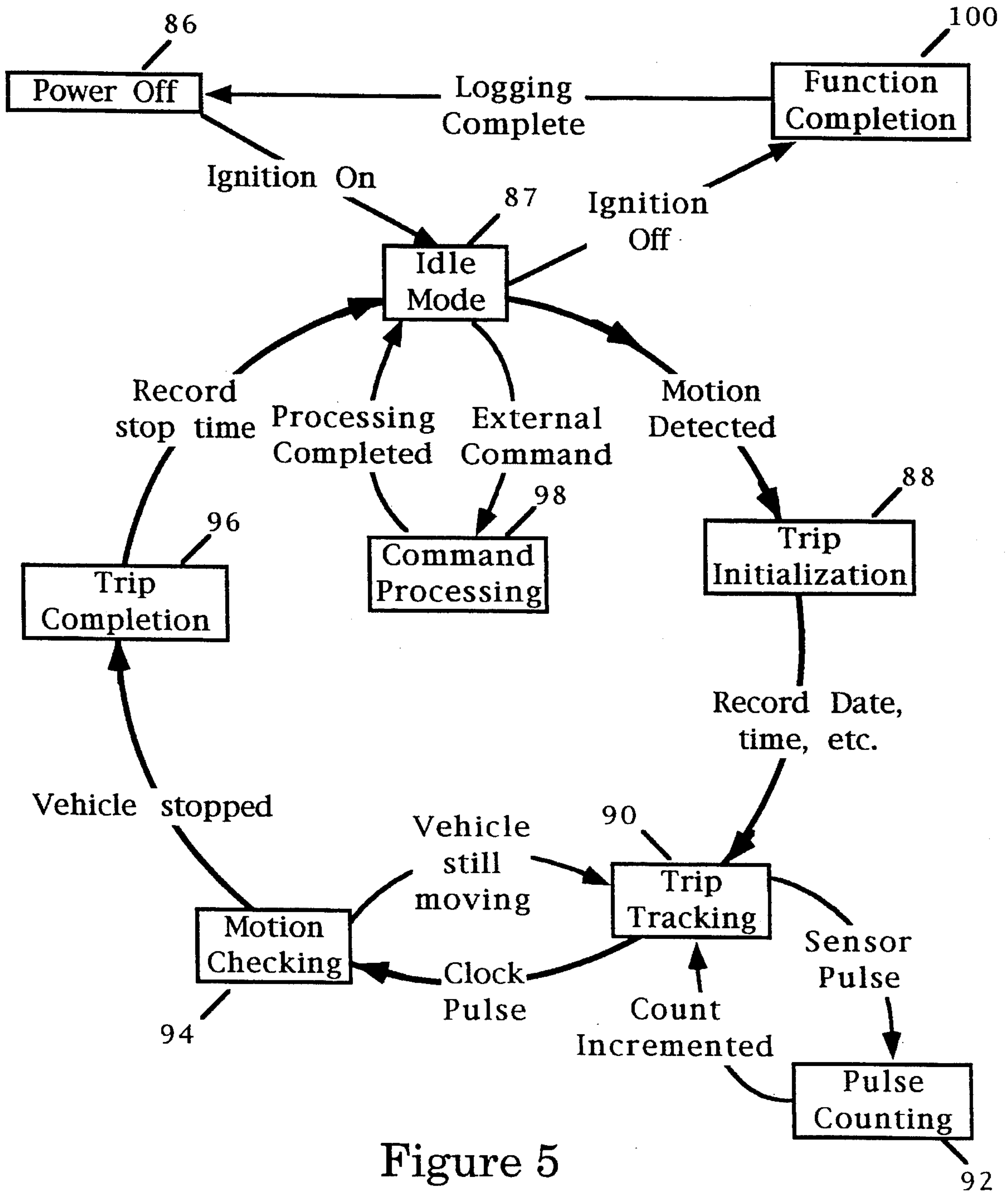
FIG. 5 is a flow diagram of the operation of the vehicle recording unit.

FIG. 5 shows the sequence of operation for the vehicle recording system 10. As shown in FIG. 5, when the vehicle is parked with the ignition off, the vehicle unit 16 is in the power-off state 86. In this state, the unit 16 is non-functional except for the clock 50 which continues to keep time, and the data memory 48, which maintains trip data using power from the battery 54.

When the ignition is turned on, the vehicle unit 26 is powered on and goes into an idle mode 87. In the idle mode 87, the microprocessor 44 checks the vibration sensor 56 several times a second to determine if the sensor has changed state. The microprocessor 44 also stands by ready to process a command if a command is received from the data reporting system 12, through the communications interface 62, or from the control buttons 18. If a command is received, the unit goes into a command processing state 98. At the completion of the command processing, the unit returns to the idle mode 87.

When the ignition is first turned on, the microprocessor 44 is powered through the ignition system. After the car is moving, the microprocessor 44 switches over and receives power directly from the vehicle battery (not shown).

If the microprocessor 44 detects a change of state in the vibration sensor 56, it interprets the change of state as the initiation of vehicle motion, and proceeds to the trip initialization state 88. In the trip initialization state 88, the microprocessor 44 reads the time and date from the clock 50 and records the time and date in the data memory 48 as the trip start time and date. After the start time and date have been stored, the vehicle unit 16 enters a trip tracking state 90 in which the microprocessor 44 waits in a stand-by state for pulses from the magnetic sensor 26 or for a pulse from the clock 50. As the vehicle moves, the magnetic sensor 26 detects the rotation of the magnets 32, 34 on the drive shaft 30, and outputs a pulse for each rotation of the shaft. Each of the pulses represents an incremental motion by the vehicle. The pulses are input to the microprocessor 44 through the sensor interface 66. As each pulse is received at the microprocessor 44, the microprocessor adds the pulse to a trip pulse count 92 in the data memory 48.

The clock 50 sends a pulse to the microprocessor 44 several times per second. Upon receipt of a clock pulse, the microprocessor 44 enters a motion checking state 94 to determine if the vehicle is still in motion. To determine if the vehicle is in motion, the microprocessor 44 checks the state of the vibration sensor 56. If the sensor 56 has changed states since the last state check, the microprocessor initiates an internal timer. If the sensor is in the same state as the last state check, the microprocessor 44 calculates the amount of time that has elapsed since the last change of state, and compares it to a predetermined time period. In the preferred embodiment, the predetermined time period is approximately 4 minutes. If the time elapsed since the last change of state, as determined from the internal timer, is less than 4 minutes, the microprocessor 44 considers the vehicle to still be moving and the microprocessor returns to the trip tracking mode 90 to wait for more pulses from either the magnetic sensor 26 or the clock 50.

If the time elapsed since the last change of state is greater than 4 minutes, the microprocessors concludes that the vehicle has stopped. The microprocessor 44 then enters a trip completion mode 96. In the trip completion mode 96, the microprocessor 44 reads and records a stop time and date value from the clock 50, and records the stop time and date in the data memory 48. After the stop time is stored in the data memory 48, the microprocessor 44 returns to the idle mode 86. In the idle mode 86, the microprocessor 44 is again ready to process commands from the control buttons 18 or communications interface 62, or to begin a new trip record upon detecting a change of state in the vibration sensor 56.

When the vehicle is turned off, if the microprocessor 44 is in the middle of processing a command 98 or completing a trip record 96, it will enter a function completion state 100 in which it will finishing processing the command or trip with power from the vehicle battery. Once the task is complete, the microprocessor 44 will turn itself off.

When the unit 16 is assembled in the factory, it is connected to a host computer (not shown) which downloads a unique identification number to the unit, and also calibrates the unit, if the calibration is known for the type of vehicle in which the unit will be installed. The unit identification number is stored in the data memory 48 and is downloaded along with the travel data each time a data download is performed. This number enables data for more than one vehicle to be simultaneously recorded on a memory card or processed in the reporting system 12.

The unit 16 is calibrated by storing the number of pulses which equal one mile of travel distance, into the data memory 48. The number of pulses per mile, or calibration factor, varies between types of vehicles and where the magnetic sensor is installed on the vehicle. If the calibration factor is not known at the factory, then the first time the unit 16 is used in a vehicle, the unit is calibrated by pushing the calibration control button 18, driving one mile, and then pushing the calibration button again. In this manner, the microprocessor 44 counts the pulses during the one mile trip and records this number in the data memory 48 as the calibration factor.

While the form of apparatus herein described constitutes a preferred embodiment of the invention, it is to be understood that the invention is not limited to this precise form of apparatus and that changes may be made therein without departing from the scope of the invention.

What is claimed is:

1. A vehicle monitoring system for use in a motor vehicle, the system comprising:

a plurality of sensors located on said vehicle for sensing vehicle operating parameters and generating signals in response thereto, said plurality of sensors including a vibration sensor;

means connected to said sensors for recording said sensor signals and generating trip data in response thereto, wherein said generation of trip data is initiated upon receipt of a signal of a change in state of said vibration sensor and wherein said recording means stops generating data after there has been no change in state of said vibration sensor for a predetermined amount of time;

means for processing said trip data and generating trip reports based thereon, said processing means being remote from said recording means and said vehicle; and means for transferring said trip data from said recording means to said processing means.

2. The system of claim 1 wherein said vibration sensor generates a signal upon detecting vehicle motion.

3. The system of claim 1 wherein said plurality of sensors include a magnetic sensor which generates travel pulses in response to movement of said vehicle.

4. The system of claim 3 wherein said magnetic sensor is mounted adjacent to a vehicle component having a speed of rotation that is proportional to vehicle speed, and wherein said sensor generates said pulses in response to rotation of said component.

5. The system of claim 4 wherein said component is a drive shaft.

6. The system of claim 5 wherein said recording means further includes:

an electronic clock for providing date and time signals;

a microprocessor for recording starting and ending time and date signals from said clock, receiving said pulses from said magnetic sensor, and continuously updating a travel distance in response to said pulses;

a program storage memory for storing instructions for said microprocessor;

a data storage memory for storing said trip data from said microprocessor; and a power supply for operating said microprocessor, said storage memories and said clock.

7. The system of claim 6 wherein said microprocessor stops updating said travel distance when said vibration sensor has maintained a constant state for said predetermined time period.

8. The system of claim 7 further comprising a plurality of magnets mounted on said drive shaft in proximity to said magnetic sensor, said magnetic sensor detecting rotation of said magnets and generating a pulse in response to said rotation.

9. The system of claim 8 wherein said recording means further comprises a control panel having means for displaying system status and means for initiating system functions.

10. The system of claim 9 wherein said power supply includes a battery for operating said clock and data storage memory when said vehicle is in an off-state.

11. The system of claim 9 wherein said control panel further includes operator-actuated input means for designating said trip as business or personal.

12. The system of claim 11 further including a remote keyboard connected to said recording means for entering identification data for said trip.

13. The system of claim 1 wherein said transferring means is comprised of an electronic memory card which is transferred between a memory card slot in said recording means and a memory card reader in said processing means.

14. The system of claim 1 wherein said transferring means is comprised of an infrared light beam which transfers said trip data from a first infrared transceiver located on said recording means to a second infrared transceiver located on said processing means.

15. The system of claim 1 wherein said transferring means comprises cellular modem means connected to said recording means.

16. The system of claim 15 wherein said cellular modem means comprises a cellular digital packet data modem.

17. A vehicle monitoring system comprising:

means for generating a distance travelled pulse for each incremental distance of travel;

means for generating a clock signal;

means for generating a trip initiation signal in response to a change in state of vibration of said vehicle;

data storage means for storing trip record data including a trip start time and date, a trip end time and date, and travel distance;

microprocessor means connected to said memory means for processing said trip record data, said microprocessor means including, means for generating a trip start time from said clock signal upon receipt of said trip initiation signal, means for continuously updating said travel distance in accordance with a number of distance travelled pulses received after receipt of said trip initiation signal, means for calculating a time since the last change of state of vibration of said vehicle, means for generating a trip end from said clock signal if no change in state of vibration of said vehicle is measured for a predetermined time period, and means for storing in said memory means said trip record data including said trip start time, said trip end time and said travel distance;

means for communicating said trip record data from said memory means to an external reporting means; and means for generating a trip report in said external reporting means.

18. The system of claim 17 wherein said vehicle includes a rotating component, and wherein said means for generating a distance travelled pulse includes:

a plurality of magnets attached to said component; and a Hall-Effect sensor mounted on said vehicle adjacent to said magnets, said sensor generating a series of pulses in response to rotation of said magnets.

19. The system of claim 18 wherein said means for generating a trip initiation signal is a vibration sensor which is connected to said microprocessor means, and wherein said vibration sensor generates a signal upon motion of said vehicle.

20. The system of claim 19 wherein said microprocessor means includes means for periodically checking said vibration sensor to determine whether said sensor has changed state, if said microprocessor determines said sensor has not changed state for a predetermined period of time, said microprocessor initiates generation of said trip end time from said clock signal, and stores said end time and date and said travel distance in said memory means.

21. The system of claim 20 wherein said communicating means is an electronic memory card interface.

22. The system of claim 20 wherein said communicating means is an infrared light beam.

23. The system of claim 21 wherein said external reporting means is a microcomputer which receives trip record data from said microprocessor means through said memory card interface, said microcomputer including software for generating trip reports from said trip record data.

24. A vehicle monitoring system for use with a motor vehicle having a drive shaft or axle, said system comprising:

a magnetic sensor mounted adjacent to said drive shaft for generating a series of pulses in response to rotation of said drive shaft;

a data recording unit connected to said sensor for receiving said pulses, and generating trip data in response thereto, said device including, an electronic clock for generating a date and time signal, a vibration sensor for detecting motion of said vehicle and generating a signal in response to said motion;

a microprocessor for recording a start time and date signal from said clock at initiation of a trip, and an end time and date signal from said clock at a conclusion of said trip, and for receiving said pulses and continuously updating a travel distance in response to said pulses, said recording of a start time and updating of said travel distance being initiated upon receipt of said signal from said vibration sensor indicating vehicle motion and being discontinued upon an absence of said vibration signal for a predetermined period of time, a data storage means for receiving and storing said starting time and date, said ending time and date, and said travel distance from said microprocessor, a program storage means for storing instructions for said microprocessor, a power supply means associated with said vehicle for operating said microprocessor, said data storage means and said clock from said vehicle power, a battery for operating said data storage means and said clock when said vehicle power is discontinued, and a control panel for displaying system status, said control panel including operator-actuated input means for inputting trip information;

a data reporting means for receiving said trip data from said recording device, and generating trip reports based upon said trip data; and an electronic memory card interface for transferring said trip data from said recording device to said data reporting means.

* * * * *